United States Patent
Kim et al.

(10) Patent No.: US 11,727,454 B2
(45) Date of Patent: Aug. 15, 2023

(54) METHOD OF PROVIDING UN-CONTACT COMMERCE SERVICE AND COMMERCE SERVER PERFORMING THE SAME

(71) Applicant: FRUM, Inc., Seoul (KR)

(72) Inventors: Myung Jin Kim, Seoul (KR); Youngmook Kwon, Seoul (KR)

(73) Assignee: FRUM, Inc., Seoul (KR)

( * ) Notice: Subject to any disclaimer, the term of this patent is extended or adjusted under 35 U.S.C. 154(b) by 303 days.

(21) Appl. No.: 17/101,082

(22) Filed: Nov. 23, 2020

(65) Prior Publication Data
US 2022/0067803 A1 Mar. 3, 2022

(30) Foreign Application Priority Data
Aug. 28, 2020 (KR) .................. 10-2020-0109659

(51) Int. Cl.
G06F 3/048 (2013.01)
G06Q 30/0601 (2023.01)
G06F 3/04842 (2022.01)
G10L 15/26 (2006.01)
H04L 12/18 (2006.01)
H04L 51/10 (2022.01)

(52) U.S. Cl.
CPC ..... G06Q 30/0601 (2013.01); G06F 3/04842 (2013.01); G10L 15/26 (2013.01); H04L 12/1813 (2013.01); H04L 51/10 (2013.01)

(58) Field of Classification Search
CPC . G06Q 30/0601; G06F 3/04842; G10L 15/26; H04L 12/1813; H04L 51/10
See application file for complete search history.

(56) References Cited

U.S. PATENT DOCUMENTS

| | | | |
|---|---|---|---|
| 2008/0262946 A1* | 10/2008 | Wren | G06Q 30/06 705/27.1 |
| 2010/0145820 A1* | 6/2010 | Johnson | H04N 21/47202 705/26.1 |
| 2010/0306058 A1* | 12/2010 | Johnson | H04N 21/47202 705/14.58 |
| 2014/0089122 A1* | 3/2014 | McDevitt | H04N 21/4821 705/26.1 |
| 2016/0232587 A1* | 8/2016 | McDevitt | G06Q 30/0623 |
| 2017/0329922 A1* | 11/2017 | Eberting | G16H 40/67 |
| 2020/0065871 A1* | 2/2020 | McDevitt | G06Q 30/0603 |
| 2022/0067803 A1* | 3/2022 | Kim | H04L 51/10 |

FOREIGN PATENT DOCUMENTS

| | | |
|---|---|---|
| KR | 10-2001-0025523 A | 4/2001 |
| KR | 10-2012-0138551 A | 12/2012 |
| KR | 10-2017-0042159 A | 4/2017 |
| KR | 10-2018-0137572 A | 12/2018 |
| KR | 10-2085796 B1 | 3/2020 |
| KR | 10-2139348 B1 | 7/2020 |

* cited by examiner

*Primary Examiner* — David Phantana-angkool
(74) *Attorney, Agent, or Firm* — Invenstone Patent, LLC

(57) ABSTRACT

The present disclosure relates to a method of providing an un-contact commerce service. The method includes checking whether audio data or video data based on an input of a purchaser is able to be received from a display device; providing access information for obtaining audio data or video data of the purchaser to the display device according to a check result; receiving audio data or video data from a purchaser device through the access information; and transmitting the audio data or the video data to a seller device and providing an interface associated with a product purchase service to the display device.

15 Claims, 14 Drawing Sheets

METHOD OF PROVIDING UN-CONTACT COMMERCE SERVICE AND COMMERCE SERVER PERFORMING THE SAME

CROSS-REFERENCE TO RELATED APPLICATIONS

This application claims the priority benefit of Korean Patent Application No. 10-2020-0109659 filed on Aug. 28, 2020, with the Korean Intellectual Property Office, the disclosure of which is incorporated herein by reference.

BACKGROUND

Technical Field

The present disclosure relates to a method of providing an un-contact commerce service and a commerce server performing the same. More specifically, the present disclosure relates to a method in which a seller and a purchaser can exchange conversations about product information and perform transactions in a non-face-to-face manner in a display device of a large screen using the purchaser's voice, and a commerce server performing the same.

Background Art

With the recent spread of non-face-to-face services, non-face-to-face digital transition is accelerating in all industries and social life areas. With the spread of non-face-to-face services, online and smart works are emerging as keywords of the digital economy, and online and smart works are rapidly expanding across all industries.

In particular, as users of online shopping and home shopping, which are representative non-face-to-face services, are rapidly increasing, non-face-to-face e-commerce is growing as a major purchasing channel. Accordingly, purchasers can purchase products through smart TVs or digital TVs that combine Internet access functions in addition to PCs and smart phones.

Among them, the TV is advantageous in that purchasers can take a closer look at product image or contents on a large screen, but it is the inconvenient of having to use a remote-control to select a desired item. In addition, when purchasing a product through a TV, it takes a lot of time for a purchaser to communicate with a seller/counselor in the form of text or audio, and to complete final payment for the product.

The background art of the invention has been written to facilitate understanding of the present disclosure. Thus, it should not be understood as acknowledging that matters described in the background art of the invention exist in the prior arts.

SUMMARY

Therefore, there is a demand for a method for overcoming limitations of communication in electronic commerce conducted in a non-face-to-face manner.

Accordingly, it was attempted to develop a commerce service that allows e-commerce to be conducted in a non-face-to-face manner while a seller and a purchaser can exchange conversations about a product in real time and make transactions.

As a result, the inventors of the present disclosure have come to develop a new un-contact commerce service that allows a purchaser and a seller to communicate with each other, by exchanging each other's opinions in various forms of data (text, audio or video data), while providing an image or video of a product provided by the seller in real time to the purchaser through a display device (e.g., a smart TV or a digital TV).

At this time, the inventors of the present disclosure have configured a method in which a purchaser's text, voice or video is obtained from a purchaser device in order to allow a seller and a device to communicate with each other through a large-screen display device which is not equipped with a camera or microphone, so that the seller and the purchaser conduct introduction and purchase consultation of products output to a display device.

Moreover, according to the inventors of the present disclosure, a purchaser can select a product kind, basic setting information, option information or the like through a phone or video chat with a seller, and check an appearance and price of a product to be purchased in practice through a display device, so that the purchaser can purchase self-made products desired by the purchaser or products customized to the purchasers.

The technical problems to be solved in this specification are not limited to the technical problems mentioned above, and other technical problems to be solved will be clearly understood by the skilled person in the art from the following description.

In order to solve the problems as described above, a method of providing an un-contact commerce service according to an exemplary embodiment of the present disclosure is provided. The method is configured to include checking whether audio data or video data based on an input of a purchaser is able to be received from a display device; providing access information for obtaining audio data or video data of the purchaser to the display device according to a check result; receiving audio data or video data from a purchaser device through the access information; and transmitting the audio data or the video data to a seller device and providing an interface associated with a product purchase service to the display device.

According to features of the present disclosure, the interface may include an interface for product introduction or product consultation.

According to another feature of the present disclosure, the interface for product introduction or product consultation may provide an image captured by the seller device or a screen output to the seller device through the display device.

According to still another feature of the present disclosure, in the providing of the interface associated with the product purchase service, if the interface is an interface for the product introduction, a chat window between a seller and the purchaser may be provided, together with the image captured by the seller device or the screen output to the seller device through the display device.

According to still another feature of the present disclosure, the interface for the product introduction may further include a one-to-many chat window between the seller and a plurality of purchasers.

According to still another feature of the present disclosure, the method may further include receiving audio data obtained through a plurality of purchaser devices; and converting received audio data into text data through a speech-to-text (STT) algorithm and transmitting the data, which is a question about a product, to the seller device.

According to still another feature of the present disclosure, in the providing of the interface associated with the product purchase service, if the interface is an interface for product consultation, at least one among an image of a product, basic setting information, price and option selection information, may be provided, together with the screen output to the seller device through the display device.

According to still another feature of the present disclosure, the providing of the interface associated with the product purchase service may further include providing an interface for selecting at least one among a product kind, product basic setting information, and option selection information to the purchaser device; and transmitting product information reflecting the purchaser's product selection information to a manager device.

According to still another feature of the present disclosure, the method may further include, after the providing of the interface associated with the product purchase service, providing a payment interface capable of purchasing a product to the purchaser device; and receiving payment information including at least one among the purchaser's name, address, unique identification information, payment information, and signature from the purchaser device.

According to still another feature of the present disclosure, the providing of the interface associated with the product purchase service may further include providing a pointer capable of selecting an object, along with a screen provided in the display device, to the purchaser device, according to a remote-control request of the purchaser device.

According to still another feature of the present disclosure, the method may further include, before the checking, registering the display device as a display device for an un-contact commerce service according to a request signal of the seller device or the purchaser device.

According to still another feature of the present disclosure, the method may further include, after the providing of the access information, receiving a captured image concerning the access information from the purchaser device and recognizing the purchaser's voice.

According to still another feature of the present disclosure, the access information may include an access code composed of at least one of numbers, Korean characters and English characters, or an access sentence, and the method may further include, after the providing of the access information, receiving audio data or video data from the purchaser device accessed through the access code or access sentence; and determining whether the purchaser device is able to use an un-contact commerce service through the display device based on the received audio data or video data.

According to still another feature of the present disclosure, the receiving of the audio data or video data may further include receiving text data of the purchaser obtained by the purchaser device.

In order to solve the problems as described above, a commerce server according to another exemplary embodiment of the present disclosure is provided. The server includes a communication unit; a storage unit; and a processor operatively connected to the communication unit and the storage unit, wherein the processor is configured to check whether audio data or video data based on an input of a purchaser is able to be received from a display device, provide access information for obtaining audio data or video data of the purchaser to the display device according to a check result, receive audio data or video data from a purchaser device through the access information, and transmit the audio data or the video data to a seller device and provide an interface associated with a product purchase service to the display device.

Details of other exemplary embodiments are included in the detailed description and drawings.

The present disclosure enables a seller and a purchaser to exchange conversations about a product in the form of text, audio, and video data in real time while viewing the same product, thereby overcoming the limitation of communication in a non-face-to-face electronic commerce. In particular, situations where it is unfeasible to conduct explanations only with text (e.g., a situation where it is difficult for a purchaser to ask questions about specific parts due to a complex structure of a product, or a situation where it is difficult to ask questions at once because product-related contents are too long) can be solved through smooth communication.

In addition, according to the present disclosure, without connecting other devices to a display device that does not have a voice or image recognition function, which a majority of people have, it is feasible to communicate with a seller and a purchaser through voice or video through a purchaser device.

Moreover, according to the present disclosure, basic information and selection information of a product before purchase can be changed by manipulation of a seller or a purchaser, and a changed image can be viewed by the seller and the purchaser together. In addition, the purchaser can purchase customized products rather than standardized products through non-face-to-face e-commerce.

Furthermore, the present disclosure allows a purchaser and a seller to communicate with each other while viewing various products in addition to one product, so that the seller can promote various products on sale, and the purchaser can avoid the hassle of searching for various products and checking them one by one.

The effects according to the present disclosure are not limited by the contents exemplified above, and more various effects are included in the present disclosure.

DETAILED DESCRIPTION OF EXEMPLARY EMBODIMENTS

Figure 1:
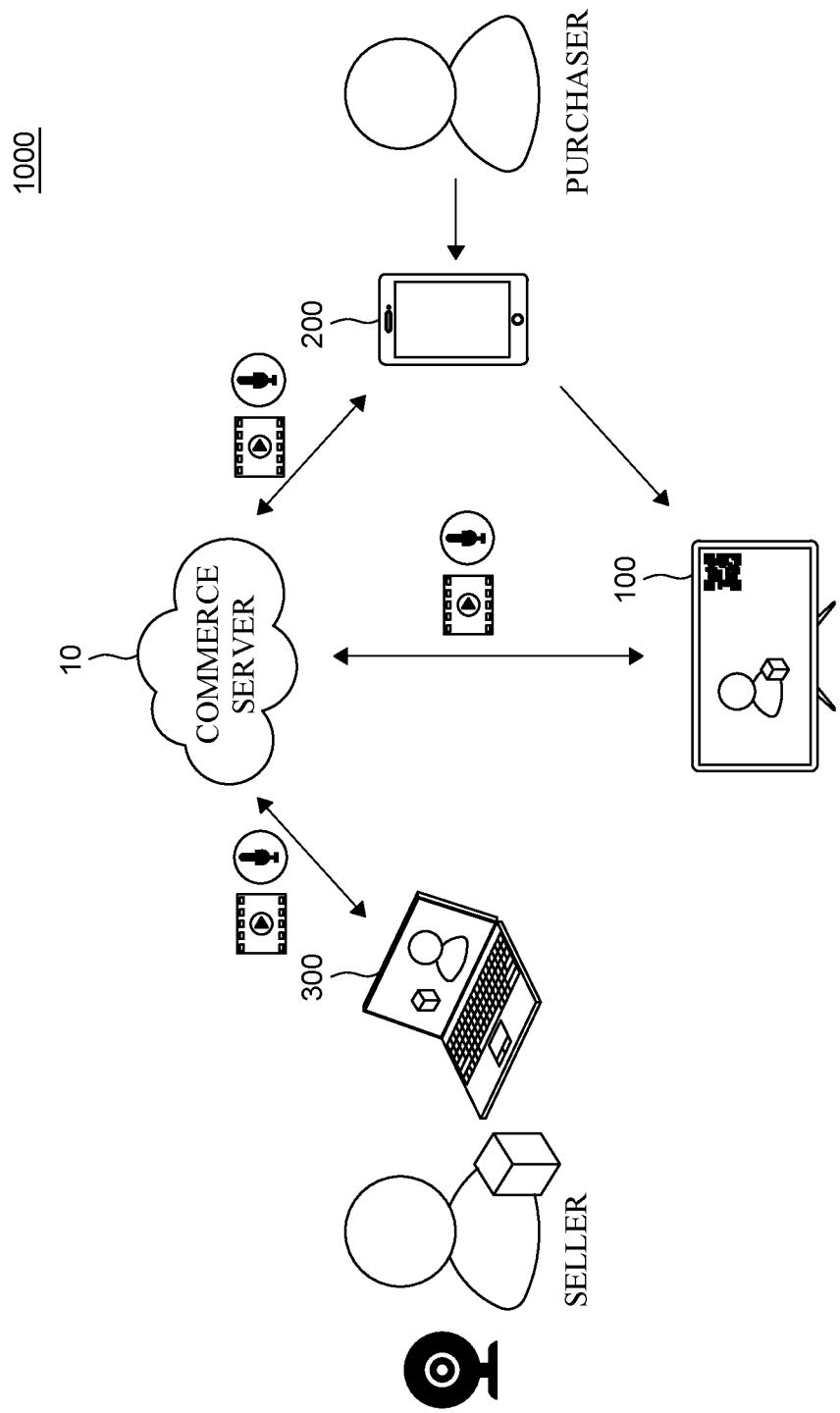
FIG. 1 is a schematic diagram of a commerce service system according to an exemplary embodiment of the present disclosure.

Advantages and features of the present disclosure and methods to achieve them will become apparent from descriptions of exemplary embodiments herein below with reference to the accompanying drawings. However, the present disclosure is not limited to the exemplary embodiments disclosed herein but may be implemented in various different forms. The exemplary embodiments are provided to make the description of the present disclosure thorough and to fully convey the scope of the present disclosure to those skilled in the art. It is to be noted that the scope of the present disclosure is defined only by the claims. In connection with the description of drawings, the same or like reference numerals may be used for the same or like elements.

In the disclosure, expressions "have," "may have," "include" and "comprise," or "may include" and "may comprise" used herein indicate presence of corresponding features (for example, elements such as numeric values, functions, operations, or components) and do not exclude the presence of additional features.

In the disclosure, expressions "A or B," "at least one of A or/and B," or "one or more of A or/and B," and the like used herein may include any and all combinations of one or more of the associated listed items. For example, the "A or B," "at least one of A and B," or "at least one of A or B" may refer to all of case (1) where at least one A is included, case (2) where at least one B is included, or case (3) where both of at least one A and at least one B are included.

The expressions, such as "first," "second," and the like used herein, may refer to various elements of various exemplary embodiments of the present disclosure, but do not limit the order and/or priority of the elements. Furthermore, such expressions may be used to distinguish one element from another element. For example, "a first user device" and "a second user device" indicate different user devices regardless of the order or priority. For example, without departing from the scope of the present disclosure, a first element may be referred to as a second element, and similarly, a second element may also be referred to as a first element.

It will be understood that when an element (for example, a first element) is referred to as being "(operatively or communicatively) coupled with/to" or "connected to" another element (for example, a second element), it can be understood as being directly coupled with/to or connected to another element or coupled with/to or connected to another element via an intervening element (for example, a third element). On the other hand, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present disclosure are used to describe specified exemplary embodiments of the present disclosure and are not intended to limit the scope of other exemplary embodiments. The terms of a singular form may include plural forms unless otherwise specified. All the terms used herein, which include technical or scientific terms, may have the same meaning that is generally understood by a person skilled in the art. It will be further understood that terms which are defined in a dictionary among terms used in the disclosure, can be interpreted as having the same or similar meanings as those in the relevant related art and should not be interpreted in an idealized or overly formal way, unless expressly defined in the present disclosure. In some cases, even in the case of terms which are defined in the specification, they cannot be interpreted to exclude exemplary embodiments of the present disclosure.

Features of various exemplary embodiments of the present disclosure may be partially or fully combined or coupled. As will be clearly appreciated by those skilled in the art, technically various interactions and operations are possible. Various exemplary embodiments can be practiced individually or in combination.

For clarity of interpretation of the present specification, terms used in the present specification will be defined below.

FIG. 1 is a schematic diagram of a commerce service system according to an exemplary embodiment of the present disclosure.

Referring to FIG. 1, a commerce service system 1000 may include a commerce server 10, a display device 100, a purchaser device 200, and a seller device 300.

The commerce server 10 may provide an un-contact commerce service to a seller and a purchaser through the display device 100. The un-contact commerce service refers to a commerce service allowing a seller and a purchaser to proceed with product purchase consultation or product purchase through a video call/voice call method, while viewing a product image output to the display device 100 together. According to an exemplary embodiment, a seller and a purchaser may communicate their intentions with each other by inputting text, recording audio, or capturing images through devices held by them. That is, the commerce server 10 may share all types of input data that can be obtained from the purchaser device 200 and the seller device 300 to the purchaser and the seller.

The commerce server 10 may provide a web application for providing an un-contact commerce service to the display device 100, or provide an image object or access information which allows for movement to a web page.

The commerce server 10 may provide product information provided by sellers and audio data or video data of the sellers to the display device 100 when a purchaser accesses it, and additionally provide text data input by the sellers in real time. Here, purchaser access means that the purchaser selects any one product in a state in which audio data or video data based on the purchaser's input is matched with the display device 100. To this end, the commerce server 10 may provide a list of products and images capable of an un-contact commerce service provided by various sellers on an initial screen of the un-contact commerce service.

When audio data or video data of the seller is provided through the display device 100, inquiry related to any one product of the purchaser watching this may be provided to display device 100 through the purchaser device 200. Here, text about an inquiry may be provided in at least one of the data formats of text data, audio data and video data. For example, audio data or video data obtained by the purchaser device 200 may be transmitted to the display device 100 and transferred to the commerce server 10, or may be directly transmitted to the commerce server 10 without passing through the display device 100.

In addition, text about an inquiry obtained by the purchaser device 200 may be text which is converted by a speech-to-text (STT) algorithm or text according to a touch input of a purchaser.

The commerce server 10 may transmit at least one of text data, audio data, and video data of the purchaser to the seller device 300. That is, the audio data or video data of the purchaser and the seller can be transmitted to each other through the commerce server 10, so that the purchaser and the seller can talk about products, while seeing each other's faces and the products like they directly face each other.

The commerce server 10 may deliver the contents of a conversation between the purchaser and the seller and at the same time, record and store the same. A stored recording file or video file may be used to resume purchase at a later time, or may be used to re-confirm the contents of consultation.

The commerce server 10 may display the faces of the purchaser and the seller together with an image of the product or provide the contents of conversation in text to the display device 100, according to a type of data provided by the purchaser and the seller. For example, the commerce server 10 may convert voices of the purchaser and seller into text using the STT algorithm, and then provide it to the display device 100 in real time. As described above, the commerce server 10 provides the contents of conversation in text, the purchaser and the seller can review additional question matters or additional check matters while looking back on text contents.

According to an exemplary embodiment, the commerce server 10 may receive images, videos, basic setting information, option selection information, and the like about products to be sold from various sellers. Thereafter, the commerce server 10 may provide an interface that allows purchasers to view the products based on information provided by the sellers. Through the above-described interface, the purchaser may rotate and look the product at a desired angle or check it in detail, and the commerce server 10 may transfer the purchaser's interface operation screen, that is, a screen of the purchaser device 200, to the display device 100 and the seller device 300.

The display device 100 may output an image, a video and the like of a product received through the commerce server 10. To this end, a web application provided by the commerce server 10 may be installed on the display device 100, or access information of the purchaser provided by the commerce server 10 may be output to the display device 100. For example, the access information may include an image object including an url, an url, an access code composed of numbers, Korean characters and English characters, an access sentence, and the like.

In the commerce service system 1000 according to an exemplary embodiment of the present disclosure, since a purchaser's voice or video can be obtained through the purchaser device 200, the display device 100 does not necessarily need to have a microphone for receiving the purchaser's voice. Accordingly, a purchaser can use an un-contact commerce service by utilizing a TV (e.g., a smart TV) and a monitor provided in the home as the display device 100. In addition, a seller and a purchaser may exchange conversations about products by using digital signage installed in an unmanned store as the display device 100. For example, through the display device 100 installed in an unmanned store, a purchaser may request a detailed description of a product to a seller.

The commerce server 10 may register each of the display devices 100 as a display device capable of providing an un-contact commerce service according to a request of a seller or purchaser, and each display device 100 may be managed by the seller or purchaser.

The purchaser device 200 is a device possessed by a purchaser for using an un-contact commerce service, and The purchaser device 200 may make a request to use the un-contact commerce service to the commerce server 10 based on an interface output to the display device 100. For example, the purchaser device 200 may capture an image object output to the display device 100 or access a url output to the display device 100 to request service use. For another example, the purchaser device 200 may input an access code (access information composed of numbers, Korean characters, and English characters) and an access sentence ("Request product consultation through a 3145 monitor/TV/display device") output to the display device 100 in a form of voice or text, and the purchaser device 200 may transmit the same to the commerce server 10 to request the use of the un-contact commerce service.

The purchaser may check a list of products capable of seller consultation and product purchase and whether a seller consultation/purchase service is available through the display device 100, and depending on service availability, the purchaser may select a product to consult and a product to purchase through the purchaser device 200.

When an image or video of a product is shown through the display device 100 and a state capable of communicating with a seller is set, the purchaser device 200 may obtain a product-related question in the form of audio data or video data from the purchaser, and transmit it to the commerce server 10. Also, the purchaser device 200 may obtain a product-related question in the form of text data from the purchaser.

According to an exemplary embodiment, the purchaser device 200 may provide an interface through which a product can be viewed more closely, and after a purchase consultation, a payment interface for product purchase may be provided. For example, the purchaser device 200 may transmit a remote-control request to the commerce server 10 and receive from the commerce server 10, a pointer capable of selecting an object or an area of a product. Accordingly, movement of a pointer which is pointed by a purchaser may be seen on a still frame within a video or an image provided by a seller, and the seller and the purchaser can simultaneously check an image of the product controlled by the purchaser.

In other words, unlike a manner of conventional home shopping in which a purchaser should unilaterally receive information on a product, the purchaser can purchase a desired product or obtain specific information on the product through communication with the seller.

The seller device 300 is a device possessed by a seller for using an un-contact commerce service, and The seller device 300 may include a product such as a smartphone, a tablet PC, a PC, a camera or the like, and a variety of electronic devices including a camera capable of obtaining an image of a seller. The seller device 300 may transmit audio data or video data for product sales to the commerce server 10 in real time.

According to an exemplary embodiment, the seller device 300 may obtain video data by directly filming a product through the camera of the seller device 300 through a seller. And also, The seller device 300 may obtain video data by displaying a product image on a screen of the seller device 300 and proceeding with product explanation of the seller through a microphone. For example, the seller can directly film real products such as vehicles, home appliances, and clothes using the seller device 300, and can explain in real time intangible products such as insurance products and ticket purchase using the seller device 300. In addition, a method of providing video data or audio data may be used in combination for convenience of description or according to a request from a purchaser.

So far, the commerce service system 1000 according to an exemplary embodiment of the present disclosure has been briefly described. According to the present disclosure, the commerce server 10 may provide a one-on-one product purchase/consultation service between a seller and a purchaser through a TV (e.g., a smart TV) provided in each home. In particular, since product purchase/consultation of a user is feasible without having a separate hardware or set-top box for recognizing a user's voice in the display device 100, a cost for constructing the commerce service system 1000 can be reduced.

Hereinafter, the commerce server 10 for providing an un-contact commerce service to a seller and a purchaser will be described in detail.

Figure 2:
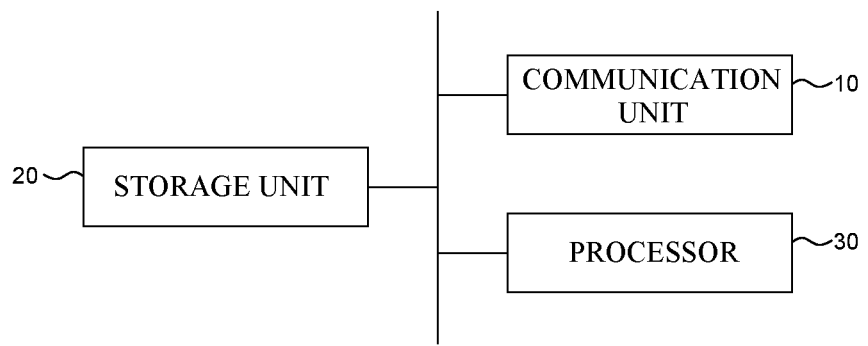
FIG. 2 is a block diagram illustrating a configuration of the commerce server according to an exemplary embodiment of the present disclosure.

FIG. 2 is a block diagram illustrating a configuration of the commerce server according to an exemplary embodiment of the present disclosure.

Referring to FIG. 2, the commerce server 10 may include a communication unit 11, a storage unit 12, and a processor 13.

The communication unit 11 may transmit and receive data to and from the display device 100, the purchaser device 200, and the seller device 300 through a wired/wireless communication network. For example, the communication unit 11 may transmit, to the display device 100, an identification number, access information (an image object, a url, an access code, and an access sentence), text data/audio data/video data provided by a seller and a purchaser, and text data obtained by converting the seller or purchaser's voice into text, for implementing an un-contact commerce service.

For another example, the communication unit 11 may receive, from the purchaser device 200, text data, audio data, video data, payment information (a purchaser's name, address, unique identification information, payment information, signature), a product kind, product basic setting information, option selection information and the like, for product purchase/consultation. In addition, the communication unit 11 may transmit and receive 1) a selection interface for selecting a base/option of a product, 2) a product operation interface for viewing the product under a control of a purchaser, and 3) a payment interface according to purchase confirmation, to and from the purchaser device 200.

Here, the communication unit 11 may receive, from the purchaser device 200, a product image, a movement of a pointer pointed by a purchaser on a still frame in an image, and a movement of a product, and the communication unit 11 may transfer this to the display device 100 and the seller device 300 in real time through the purchaser device 200. In addition to this, the communication unit 11 may receive a request for registration of the display device 100 to use an un-contact commerce service from the purchaser device 200.

For another example, the communication unit 11 may receive audio data or video data about a seller and a product from the seller device 300 and transmit to the seller device 300, a purchaser's text data, audio data or video data and remote-control data through the purchaser device 200.

The communication unit 11 may mediate a conversation between a seller and a plurality of purchasers. Specifically, the communication unit 11 may receive text data, audio data, or video data for introducing a product at a specific date and time from the seller device 300. The communication unit 11 may transmit information on a specific date and time to the display device 100 in advance, and receive questions to be transmitted to the seller device 300 from the plurality of purchaser devices 200 at the corresponding date and time. Here, the questions may be received in the form of text data, audio data, or video data, and in the case of audio data and video data, it may be converted into text by the processor 13 and then transmitted to the seller device 300.

The storage unit 12 may store identification information of the display device 100, the purchaser device 200, and the seller device 300, and store product information capable of providing an un-contact commerce service. For example, the storage unit 12 may store a detailed image, a video, basic setting information, option selection information, seller information, and information of the seller device 300 available for purchase/consultation for each product, and store purchase/consultation history and contents for each purchaser.

In addition, the storage unit 12 may store access information transmitted to the display device 100. Here, the access information may include an image object, a url, an access code composed of numbers, Korean characters, and English characters, and an access sentence.

In various exemplary embodiments, the storage unit 12 may include a volatile or nonvolatile recording medium capable of storing various types of data, commands, and information. For example, the storage unit 12 may include at least one type of storage medium among a flash memory type, a hard disk type, a multimedia card micro-type, a card type memory (for example, SD or XD memory), RAM, SRAM, ROM, EEPROM, PROM, a network storage, a cloud, and blockchain database.

In addition, commands for operations of the commerce server 10 may be recorded on the storage unit 12. In various exemplary embodiments, an application (not shown) for performing product purchase/consultation while a seller and a purchaser view the same product through the display device 100 may be recorded on the storage unit 12.

The processor 13 is operatively connected to the communication unit 11 and the storage unit 12, may control an overall operation of the commerce server 10 and run an application or program stored in the storage unit 12 to thereby execute various commands for providing an un-contact commerce service.

The processor 13 may correspond to a computing device such as a central processing unit (CPU) or an application processor (AP). In addition, the processor 13 may be implemented in the form of an integrated chip (IC) such as a System on Chip (SoC) in which various computing devices are integrated.

According to an exemplary embodiment, the processor 13 may check whether audio data or video data based on a purchaser's input can be received from the display device 100. Specifically, the processor 13 may register any one display device 100 as the display device 100 for an un-contact commerce service according to a request signal from the purchaser device 200 or the seller device 300. In this process, the processor 13 may request the purchaser's audio data or video data to the display device 100 and wait for a response signal according to the request from the display device 100.

When the communication unit 11 fails to receive audio data or video data from the display device 100 for a predetermined period of time, the processor 13 may determine that the display device 100 is not equipped with a microphone or camera. Accordingly, the processor 13 may provide access information for obtaining the purchaser's audio data or video data to the display device 100 through the communication unit 11. Here, the access information may include an image object, a url, an access code composed of numbers, Korean characters, and English characters, and an access sentence, and the access information may be transmitted to the commerce server 10 in various ways according to the purchaser's selection.

According to an exemplary embodiment, the purchaser device 200 may transmit a captured image concerning access information to the commerce server 10 and in response to this, the processor 13 may provide the purchaser's voice as request information to the display device 100. The processor 13 may recognize the purchaser's voice and confirm that conditions for using an un-contact commerce service are satisfied According to another exemplary embodiment, the purchaser device 200 may obtain audio data or video data of the purchaser about access information, and transmit it to the commerce server 10. The processor 13 may determine whether the purchaser can use an un-contact commerce service through the purchaser device 200 based on the received audio data or video data. Specifically, the processor 13 may convert the purchaser's voice data into text to check access information, and determine whether the purchaser has provided valid access information. If invalid access information is provided, the processor 13 may generate a notification of retransmission of access information and provide it to the purchaser device 200.

When audio data or video data of the purchaser is received through the above-described process, the processor 13 may provide an interface associated with a product purchase service to the display device 100.

Meanwhile, when the communication unit 11 receives audio data or video data from the display device 100 within a predetermined period of time, the processor 13 may provide an interface associated with a product purchase service to the display device 100.

According to an exemplary embodiment, the interface associated with a product purchase service may include a product consultation service and a product purchase service. The processor 13 may provide an image captured by the seller device 300 or a screen output to the seller device 300 through the display device 100 according to a type of a product or un-contact commerce service. In other words, the purchaser may have a conversation with the seller while viewing an image/video captured by the seller through the display device 100 or while seeing a screen output from the seller device 300.

After providing the interface, the processor 13 may transmit new audio data or video data to the seller device 300 in real time through the purchaser device 200.

According to an exemplary embodiment, if the interface is an interface for product introduction, the processor 13 may provide a chat window between the seller and the purchaser, together with an image captured by the seller device 300 or the screen output to the seller device 300, through the display device 100. For example, when a purchaser transmits video data, a purchaser's face is output to the display device 100, and a seller may also check the purchaser's face output to the display device 100.

Moreover, in the case of an interface for product introduction, a plurality of purchasers may participate in a conversation with the seller, and the processor 13 may provide a one-to-many conversation window between the seller and the plurality of purchasers through the display device 100.

However, in the case of a one-to-many conversation, the seller has limitation in answering all purchasers' questions based on the purchasers' audio data or video data, simultaneously with the product introduction. Accordingly, the processor 13 may receive audio data obtained through a plurality of purchaser devices 200 and convert questions about a product into text data through a speech-to-text (STT) algorithm. The converted text data may be transmitted to the seller device 300 to help the seller respond in real time.

According to another exemplary embodiment, if the interface is an interface for product consultation, the processor 13 may provide at least one among an image of a product, basic setting information, price and option selection information, together with an image captured by the seller device 300 or a screen output to the seller device 300, through the display device 100.

In the un-contact commerce service according to an exemplary embodiment of the present disclosure, a seller may basically explain basic information, additional information, and resultant price information of a product through the seller device 300. That is, in order for the seller to proceed with explanation of a product, it is necessary to recognize what information the purchaser should select for product purchase, so that the processor 13 may provide to the display device 100, various basic/optional selection information for product purchase consultation.

However, even if the seller can show the screen or image of the product according to a request of the purchaser, there may be a situation in which the purchaser's intention is not properly transmitted to seller. Accordingly, the processor 13 may provide an interface for selecting at least one among a product kind, product basic setting information, and option selection information to the purchaser device 200 according to the remote-control request received from the purchaser device 200.

Thereafter, the processor 13 controls the communication unit 11 to transmit product information reflecting the purchaser's product selection information to the seller device 300, or receive a screen output to the purchaser device 200 in real time to transfer it to the seller device 300. In other words, a purchaser, not a seller, may directly input various types of selection information associated with a product, and the seller may check it in real time to proceed with purchase consultation.

In addition to this, the processor 13 may provide a pointer capable of selecting an object to the purchaser device 200 according to the remote-control request received from the purchaser device 200. Accordingly, the purchaser may check the screen provided to the display device 100 in the purchaser device 200 and select a portion where additional explanation is desired with the pointer in the checked screen. The processor 13 may transmit the purchaser's selection information to the seller device 300.

When a final version of a product to be purchased by the purchaser and the amount thereof are calculated through product consultation, the processor 13 may provide a payment interface through which the product can be purchased through the purchaser device 200. Thereafter, the processor 13 may receive payment information including at least one among the purchaser's name, address, unique identification information, payment information, and signature from the purchaser device 200 through the communication unit 11.

So far, the commerce server 10 according to an exemplary embodiment of the present disclosure has been described. According to the present disclosure, through the commerce server 10, the seller and the purchaser can exchange conversations about a product in real time while viewing the same product, thereby overcoming the limitation of communication in electronic commerce of a non-face-to-face manner.

Hereinafter, an interface provided to the display device 100 or the purchaser device 200 by the commerce server 10 will be described.

FIGS. 3A to 6B are schematic diagrams illustrating a commerce service interface implemented in a display device or a purchaser device according to an exemplary embodiment of the present disclosure.

Figure 3A:
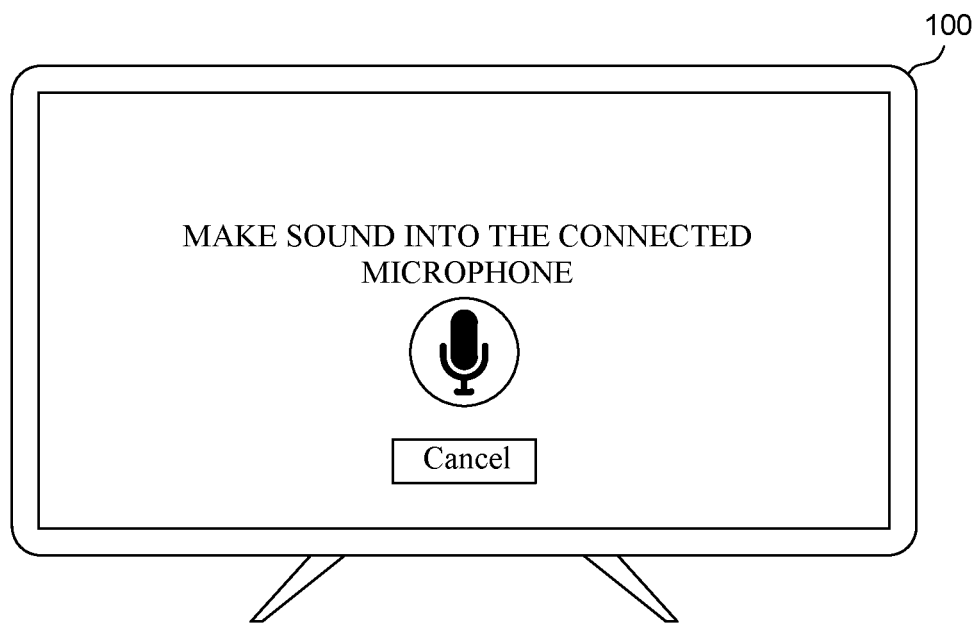
FIGS. 3A to 6B are schematic diagrams illustrating a commerce service interface implemented in a display device or a purchaser device according to an exemplary embodiment of the present disclosure.

Referring to FIG. 3A, when the display device 100 attempts to obtain a purchaser's voice according to the purchaser's request for audio data or video data from the commerce server 10, the following screen may be provided.

Figure 3B:
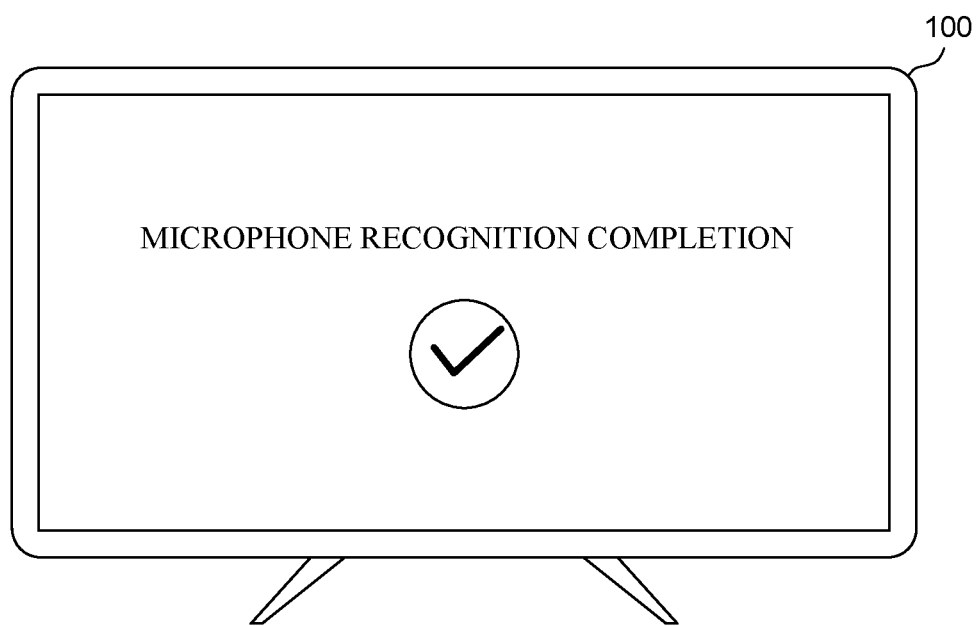
Figure 3C:
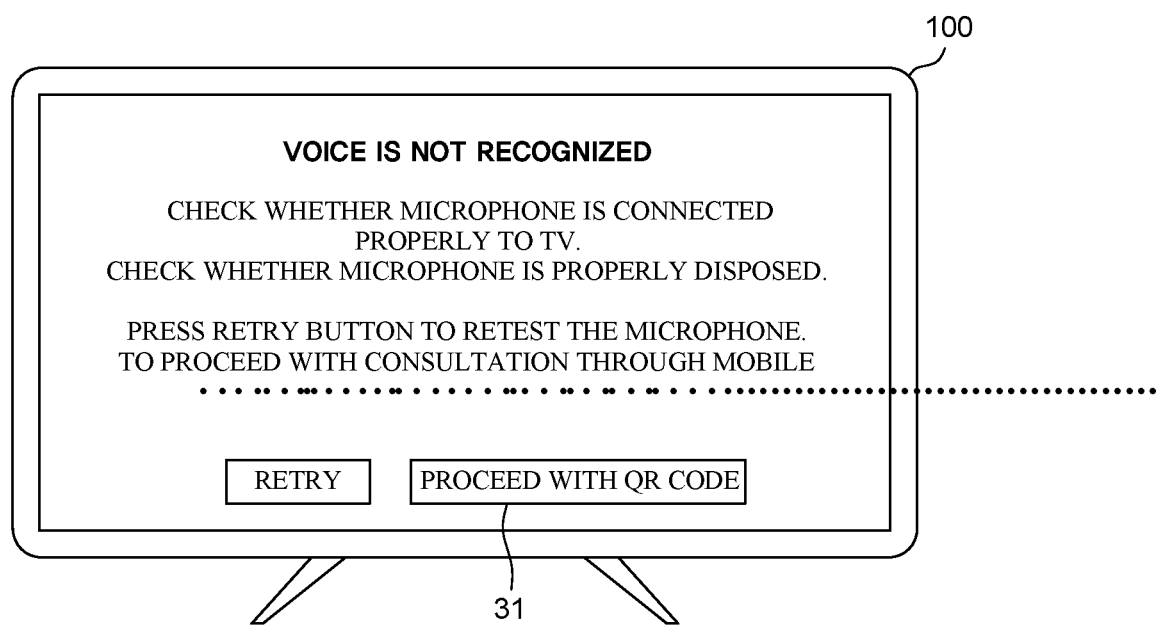

If voice recognition of the purchaser is feasible through the display device 100, a screen as shown in FIG. 3B may be provided, and if a separate hardware or additional device (e.g., a set-top box) for voice recognition is not provided in the display device 100, a screen as shown in FIG. 3C may be provided.

When the purchaser's voice cannot be recognized only by the display device 100, the purchaser selects an icon 31 "recognize with an image object (a QR code)", and then, the purchaser device 200 may provide the purchaser's audio data or video data to the commerce server 10 based on access information(image object) output to the display device 100.

For example, the purchaser device 200 may access the commerce server 10 through a url included in access information, and transfer audio data, video data or input data which is acquired through a microphone or input device provided in the purchaser device 200 may be transmitted to the commerce server 10. The commerce server 10 may provide data received from the purchaser device 200 to be displayed on the display device 100 and may also provide the data to the seller device 300.

Figure 4:
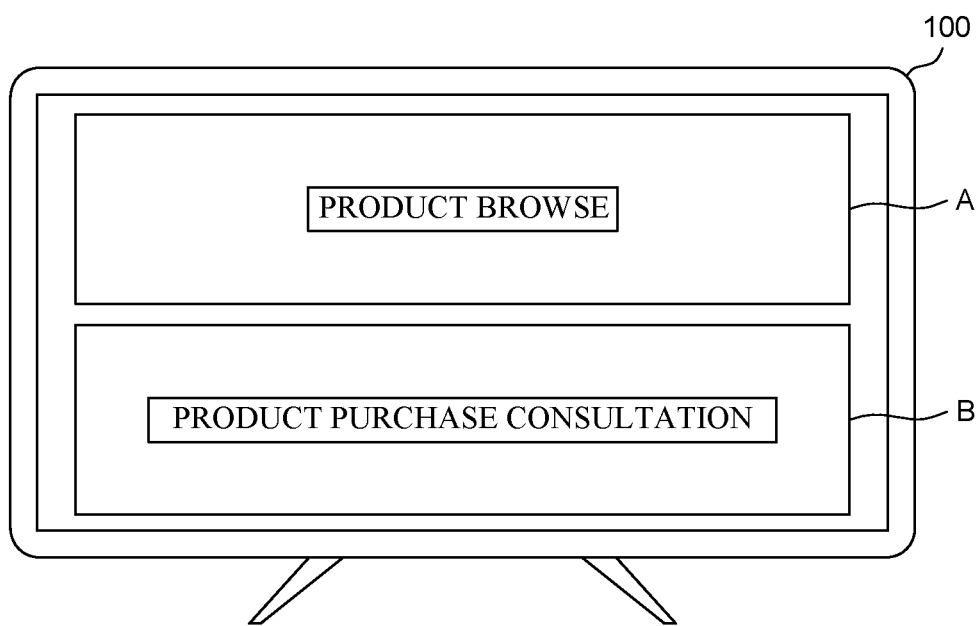

When a request for using an un-contact commerce service from the purchaser is received from the commerce server 10, various interfaces associated with a product purchase service may be provided through the display device 100 as shown in FIG. 4.

Figure 5A:
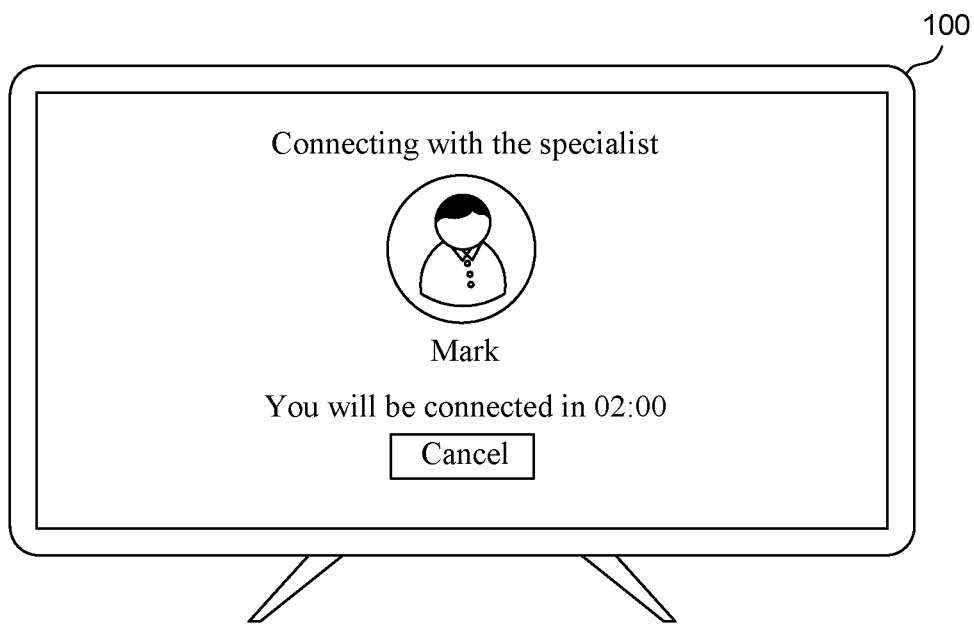
Figure 5B:
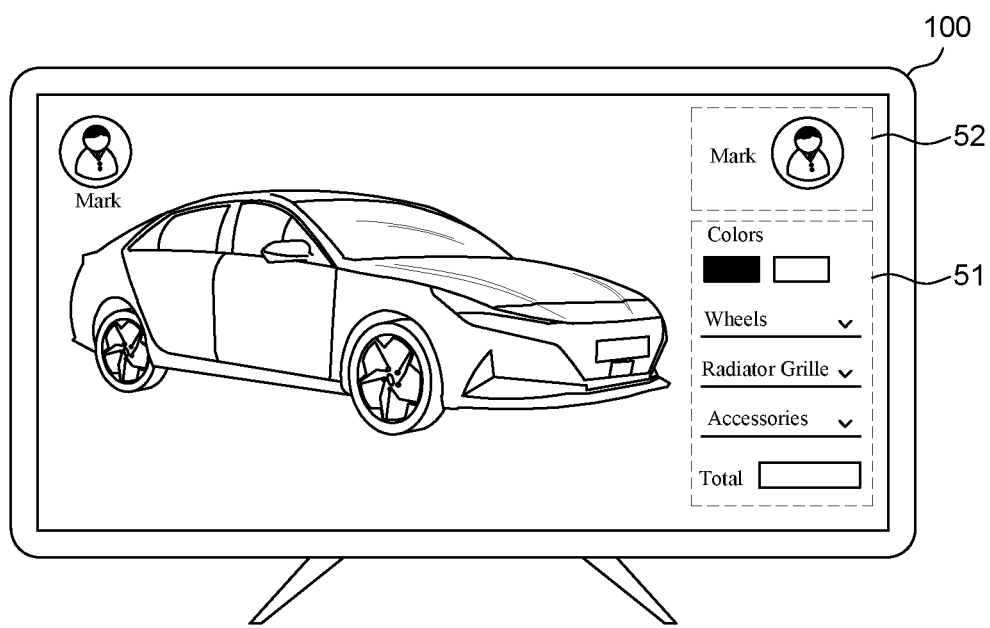

If the purchaser selects an interface B for product purchase consultation among them, as shown in FIG. 5A, information regarding a wait time required to wait until a consultation starts, along with an image of a seller to conduct the consultation, may be provided. When the wait time elapses and the purchaser and the seller are connected, as shown in FIG. 5B, basic information, additional information, and resultant price information 51 of the product may be provided to a purchaser through display device 100 along with an image of the product, and an appearance 52 of the seller may be provided together.

Figure 5C:
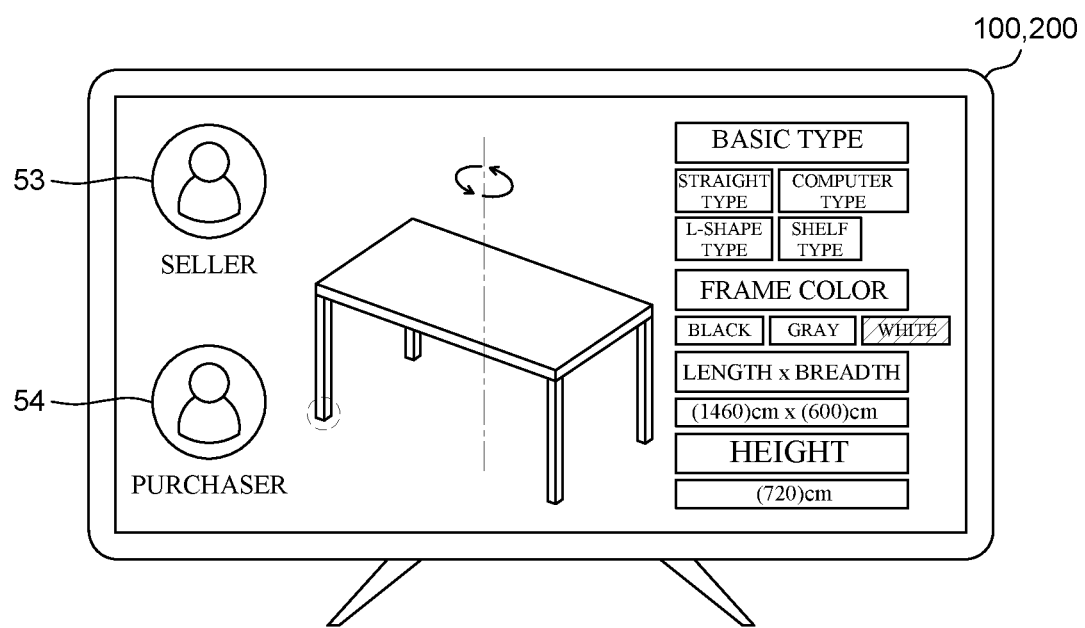

When the remote-control request is executed according to the request of the purchaser, an interface for selecting basic information, additional information or the like is provided to a purchaser through the purchaser device 200 as shown in FIG. 5C, and it is output to the display device 100 and at the same time, may be transferred to the seller device 300. In addition, video data 53 and 54 of the seller and the purchaser are output together to the display device 100, so that inconvenience of communication may be eliminated.

Figure 5D:
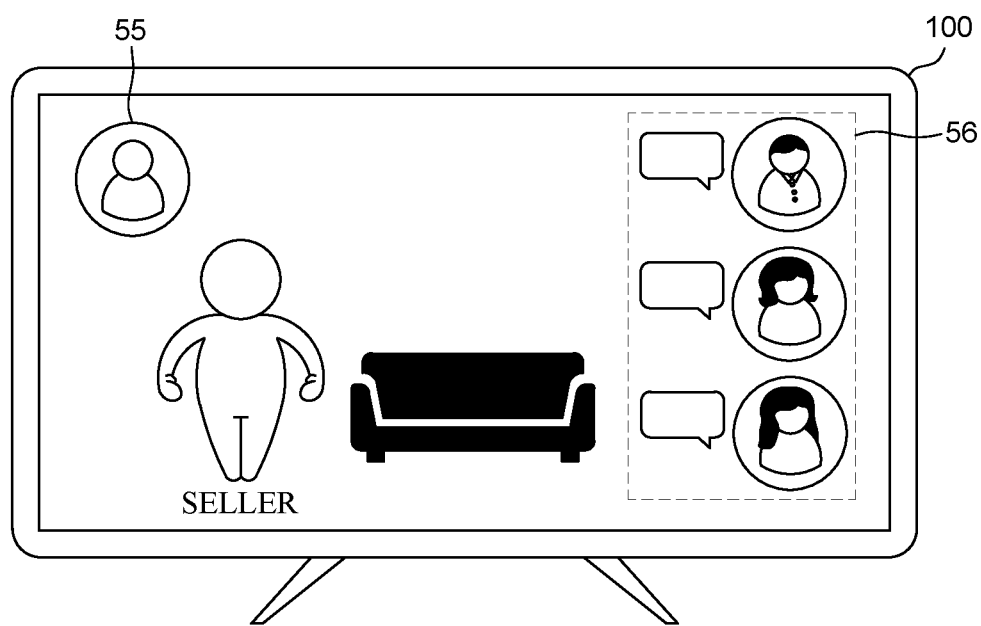

Moreover, when the purchaser selects an interface A for product browse among them, the appearance of the seller introducing the product can be imaged and provided in real time, as shown in FIG. 5D. In this case, when product introduction is conducted in a one-to-many manner, appearances of a plurality of purchasers or inquiry contents of the purchasers may be provided to one area 56 of the display device 100.

In addition, when product introduction is conducted in a one-to-one manner, an appearance of the purchaser may be provided to the other area 55 of the display device 100, and the purchaser's question in the form of audio data or video data is converted into text data and may be provided to the display device 100.

Figure 6A:
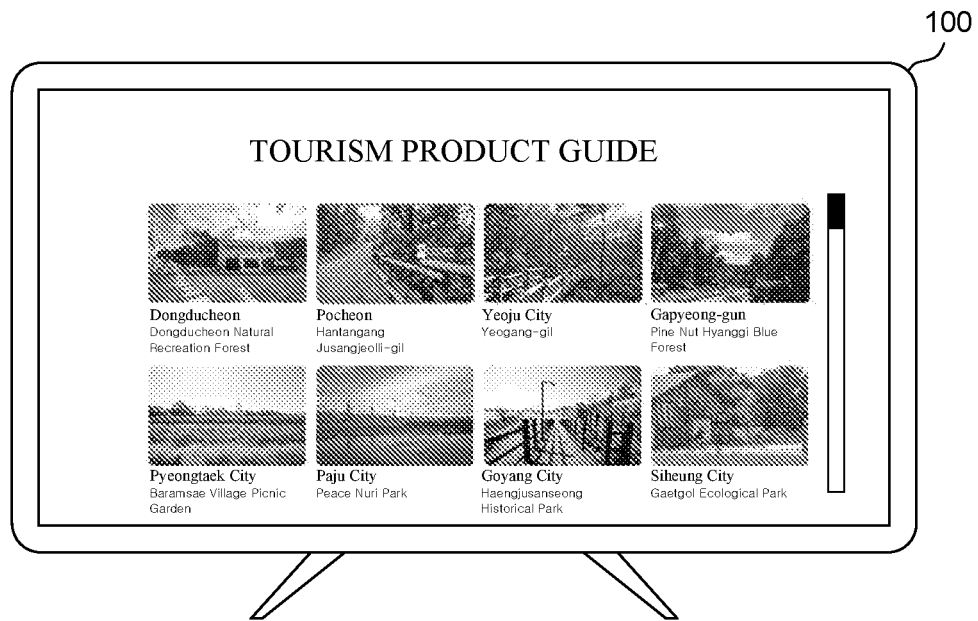

Meanwhile, when a product purchased by a purchaser is an intangible product rather than a real product, a screen output from the seller device 300 may be provided to the display device 100 as shown in FIG. 6A.

Figure 6B:
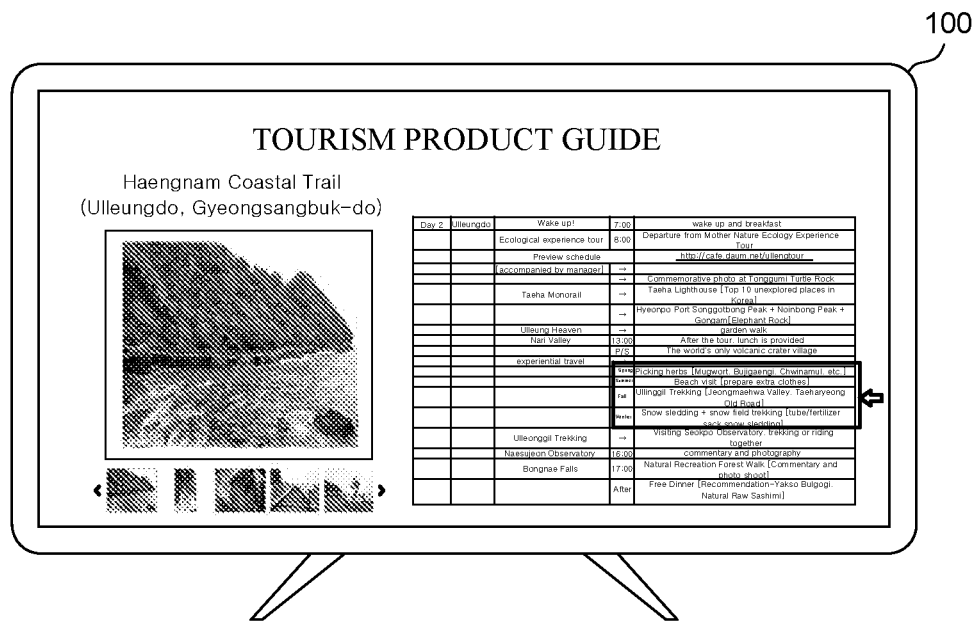

For example, when a purchaser requests a consultation on any one of various tourism products, a schedule table may be provided along with a representative image of the tourism product as shown in FIG. 6B. The purchaser and the seller can delete or add a necessary schedule according to a request of the purchaser, while viewing the schedule table together, and the purchaser can check a total product amount according to a coordinated schedule through the display device 100.

So far, an interface screen provided by a commerce server 10 to the display device 100 or the purchaser device 200 according to an exemplary embodiment of the present disclosure has been exemplarily described. Hereinafter, a method of registering the display device 100 before providing an un-contact commerce service will be described with reference to FIG. 7.

Figure 7:
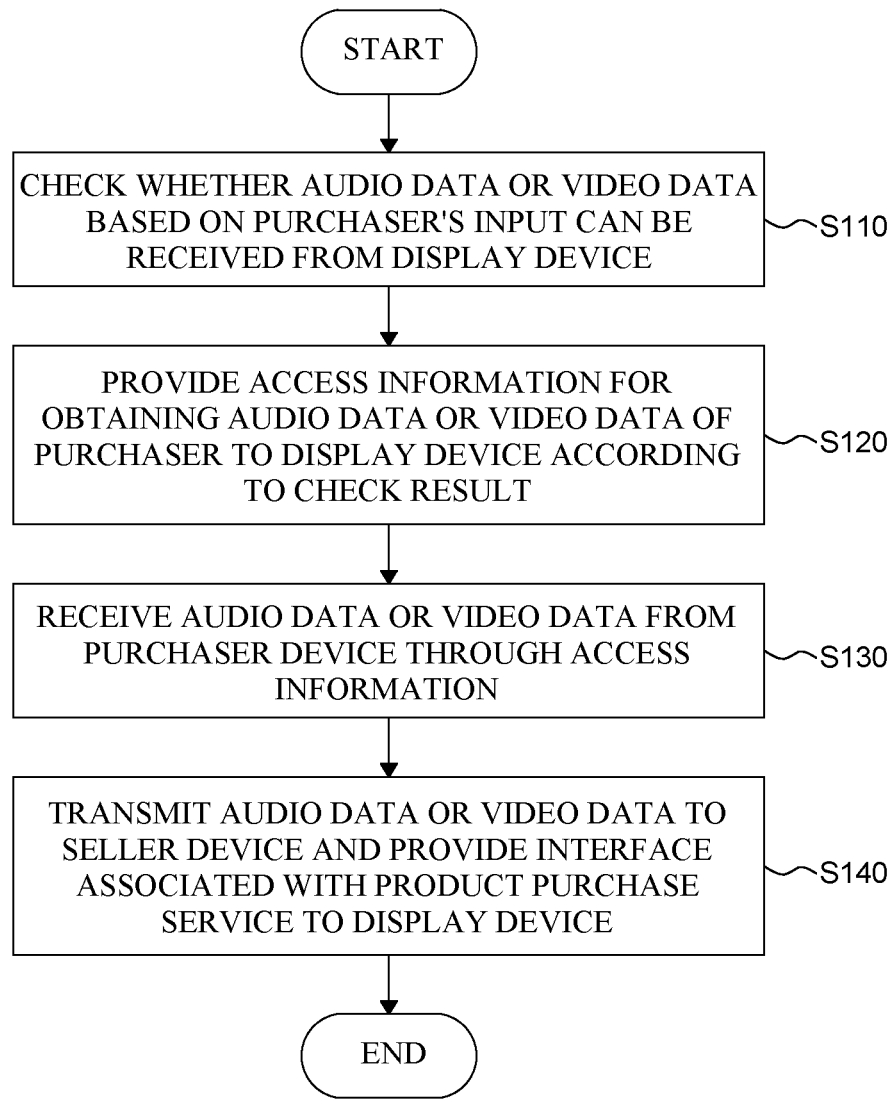
FIG. 7 is a schematic flowchart of a method of providing a commerce service according to an exemplary embodiment of the present disclosure.

FIG. 7 is a schematic flowchart of a method of providing a commerce service according to an exemplary embodiment of the present disclosure.

Referring to FIG. 7, the commerce server 10 checks whether audio data or video data based on a purchaser's input can be received from the display device 100 in step S110. Specifically, the commerce server 10 may register any one of the display devices 100 as the display device 100 for an un-contact commerce service according to a registration request of the purchaser device 200 or the seller device 300.

In this process, the commerce server 10 requests audio data or video data based on a purchaser's input from the display device 100 and wait for a response signal according to the request from the display device 100.

According to a check result in step S110, the commerce server 10 provides access information for obtaining audio data or video data of the purchaser to the display device 100 in step S120, and receives audio data or video data from the purchaser device 200 through the access information, in step S130. Specifically, when the commerce server 10 fails to receive audio data or video data from the display device 100 within a predetermined period of time, it is determined that the display device 100 is not equipped with a microphone or camera, and the commerce server 10 may provide access information to the display device 100 to receive purchaser's audio data or video data from a purchaser device 200. In this case, the access information may include an image object, a url, an access code composed of numbers, Korean characters, and English characters, and an access sentence, and the access information may be transmitted to the commerce server 10 in various ways according to the purchaser's selection.

According to an exemplary embodiment, the purchaser device 200 may transmit a captured image concerning access information to the commerce server 10, and in response to this, the commerce server 10 may provide a purchaser's voice as request information to the display device 100. The commerce server 10 may recognize the purchaser's voice and confirm that a condition for using an un-contact commerce service is satisfied.

According to another exemplary embodiment, the purchaser device 200 may obtain a purchaser's audio data or video data about access information, and transmit it to the commerce server 10. The commerce server 10 may determine whether the purchaser can use an un-contact commerce service through the purchaser device 200 based on the received audio data or video data. Specifically, the commerce server 10 may convert the purchaser's voice data into text to check access information, and determine whether the purchaser has provided valid access information. If the purchaser provided invalid access information, the commerce server 10 may generate an access information re-transmission notification and provide it to the purchaser device 200.

Through step S130, the commerce server 10 may check through which display device 100 the purchaser intends to use an un-contact commerce service, and may provide an interface associated with a product purchase service through the display device 100. Thereafter, the commerce server 10 may transmit the audio data or video data of the purchaser received from the purchaser device 200 to the seller device 300. In addition, the commerce server 10 may transmit text data of the purchaser received from the purchaser device 200 to the seller device 300.

That is, after step S130, the commerce server 10 transmits text data, audio data, or the video data to the seller device 300, and provides an interface associated with the product purchase service to the display device 100 in step S140.

According to an exemplary embodiment, the interface provided by the commerce server 10 may include an interface for product introduction or product consultation. The commerce server 10 may provide a screen output to the seller device 300 or an image captured by the seller device 300 through the display device 100 according to a type of a product or an un-contact commerce service. For example, if an interface provided by the commerce server 10 is an interface for product introduction, the commerce server 10 may provide a one-to-one or one-to-many chat window between a seller and a purchaser, along with a screen output to the seller device 300 or an image captured by the seller device 300 through the display device 100. Here, in the case of a one-to-many conversation, the seller has limitation in answering all purchasers' questions based on the purchasers' audio data or video data, simultaneously with product introduction. Accordingly, the commerce server 10 may receive audio data obtained through a plurality of purchaser devices 200 and convert questions about a product into text data through a speech-to-text (STT) algorithm. The converted text data may be transmitted to the seller device 300 to help the seller respond in real time.

For another example, if the interface provided by the commerce server 10 is an interface for product consultation, the commerce server 10 may provide at least one among an image of a product, basic setting information, price and option selection information, together with an image captured by the seller device 300 or a screen output to the seller device 300, through the display device 100.

Through steps S110 to S140 described above, the commerce server 10 may register the display device 100 as a device capable of an un-contact commerce service and provide an interface for using the service to the purchaser.

Hereinafter, a method of using an un-contact commerce service by a purchaser through the registered display device 100 will be described.

Figure 8:
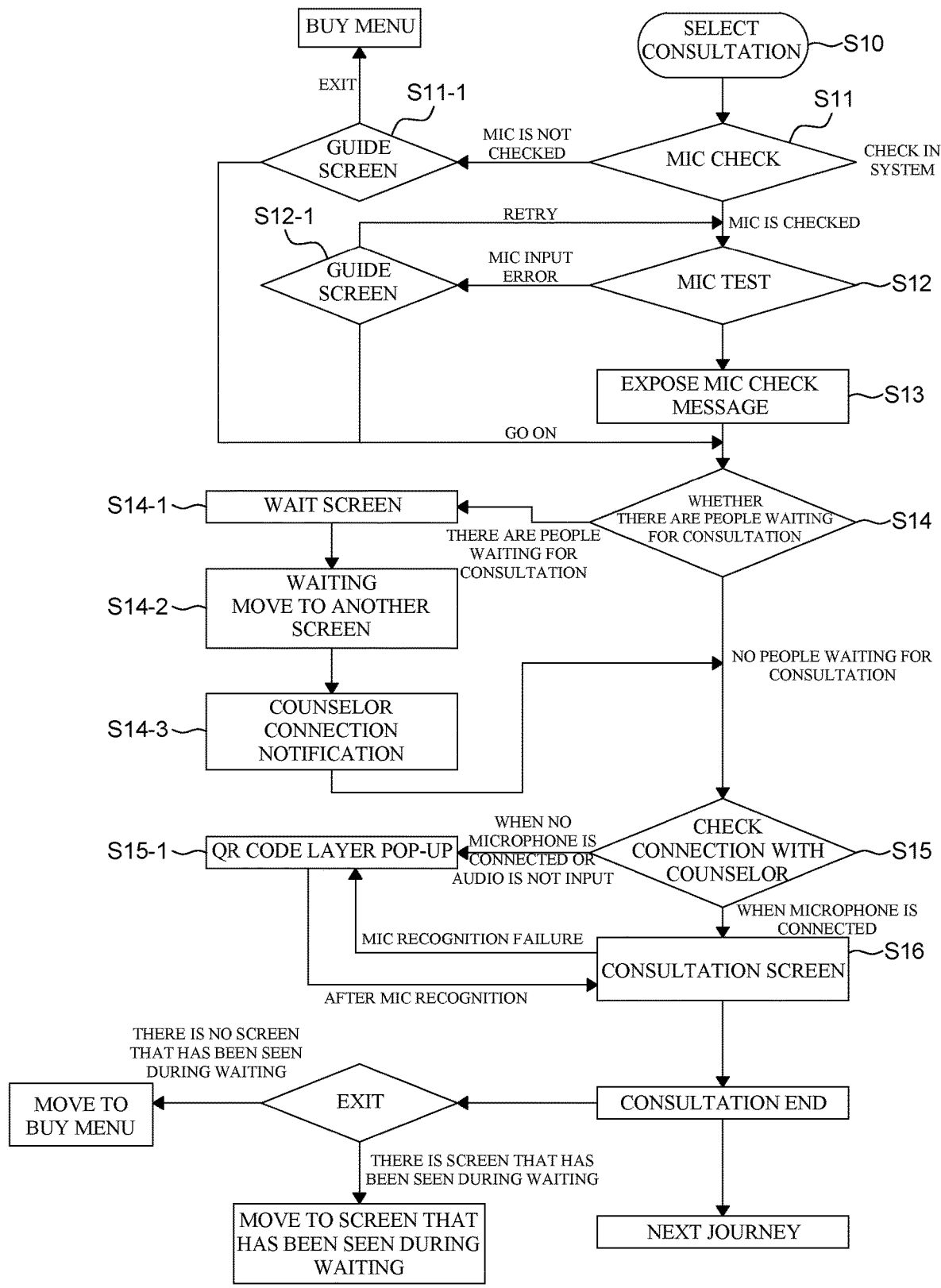
FIG. 8 is a schematic flowchart of a method of using an un-contact commerce service by a purchaser according to an exemplary embodiment of the present disclosure.

FIG. 8 is a schematic flowchart of a method of using an un-contact commerce service by a purchaser according to an exemplary embodiment of the present disclosure.

Referring to FIG. 8, a purchaser may select a consultation from various un-contact commerce service menus such as product introduction, consultation, product purchase, and product subscription output on the display device 100, in Step S10. Accordingly, the commerce server 10 may perform a microphone check to check whether the display device 100 can receive the purchaser's audio data in Step S11. Here, the microphone check may be performed by making the commerce server 10 to wait for a response to a request for obtaining audio data from the display device 100 for a predetermined period of time.

If a microphone is embedded in or is not connected to the display device 100, the commerce server 10 may provide a guide screen including access information to the display device 100 so as to obtain audio data of the purchaser through the purchaser device 200, in Step S11-1.

The guide screen may include a "exit/go on" icon. When a purchaser selects the "exit" icon, the commerce server 10 may re-provide un-contact commerce service menus such as product introduction, consultation, product purchase, and product subscription, through the display device 100. In addition, when the purchaser selects the "go on" icon, the commerce server 10 may assume that the purchaser will conduct consultation using the purchaser device 200.

Meanwhile, when a microphone exists in the display device 100, the commerce server 10 obtains the purchaser's voice and may perform a microphone test (a MIC test) to check whether a volume of the purchaser's voice (audio data) satisfies a reference condition, in Step S12.

If the volume of the purchaser's voice does not satisfy the reference condition, the commerce server 10 may provide a guide screen including access information to the display device 100 so as to obtain audio data of the purchaser through the purchaser device 200, in Step S12-1.

Conversely, when the volume of the purchaser's voice satisfies the reference condition, the commerce server 10 provides a microphone check message to the display device 100 in step S13, and the commerce server 10 may check the current business progress of a seller who consults a corresponding product and check whether a person who waits for consultation exists in step S14.

Here, when a person who waits for consultation exists, the commerce server 10 provides a wait screen to the display device 100 in step S14-1, and according to the purchaser's selection, the commerce server 10 may be move to another screen, such as access to a one-to-many product introduction service and the like, during the waiting time, in step S14-2. Thereafter, when the seller is ready to consult with the purchaser, the commerce server 10 provides a counselor connection notification to the display device 100 in step S14-3, and the commerce server 10 may check a connection between the purchaser and the seller in step S15.

In step S15, when the display device 100 and the audio data based on the purchaser's input are in a connection state in which they are matched with each other, the commerce server 10 may provide the display device 100 with a consultation screen provided by the seller in step S16. For example, the commerce server 10 can be provided by the display device 100 with an image captured by the seller device 300 or a screen output to the seller device 300.

On the other hand, in step S15, when no microphone is connected to the display device 100 or when the purchaser's audio data cannot be obtained, the commerce server 10 may provide access information to the display device 100 in step S15-1. For example, the access information may include an image object, a url, an access code composed of numbers, Korean characters and English characters, an access sentence, and the like.

Through the above-described process, the purchaser and the seller may conduct a product purchase consultation based on a screen provided on the display device 100. After the consultation is over, the purchaser can look at other products, and if using another un-contact commerce service while waiting for the consultation, the purchaser may return to the corresponding service screen.

So far, a method of using an un-contact commerce service by a purchaser according to an exemplary embodiment of the present disclosure has been described. According to the present disclosure, the purchaser can use an un-contact commerce service through the purchaser device 200 possessed by the purchaser without connecting a set-top box, a connector, or other devices to a display device which is not equipped with a voice or image recognition function.

Although the exemplary embodiments of the present disclosure have been described in detail with reference to the accompanying drawings, it is to be understood that the present disclosure is not limited to those exemplary embodiments and various changes and modifications may be made without departing from the scope of the present disclosure. Therefore, the exemplary embodiments disclosed in the present disclosure are intended to illustrate rather than limit the scope of the present disclosure, and the scope of the technical idea of the present disclosure is not limited by these exemplary embodiments. Therefore, it should be understood that the above-described exemplary embodiments are illustrative in all aspects and not restrictive. The scope of the present disclosure should be construed according to the claims, and all technical ideas within the scope of equivalents should be construed as falling within the scope of the present disclosure.

What is claimed is:

1. A method of providing an un-contact commerce service between a seller device operated by a seller and a purchaser device operated by a purchaser, the purchaser further operating a display device configured to be connected to a commerce server providing the un-contact commerce service, the method comprising:
   checking, based on an input of the purchaser, whether audio data or video data can be received from the display device, the checking determining whether the display device is equipped with a microphone or camera;
   providing, to the display device, access information for obtaining audio data or video data of the purchaser, if the checking determines that the display device is not equipped with a microphone or camera;
   receiving audio data or video data from the purchaser device through the access information;
   determining whether the purchaser device can use the un-contact commerce service through the display device, based on the audio data or video data received from the purchaser device;
   transmitting, to the seller device, the audio data or video data received from the purchaser device; and
   providing an interface associated with a product purchase service to the display device, the product purchase service associated with a product indicated by the audio data or video data received from the purchaser device,
   wherein the interface associated with the product purchase service is configured to include:
   an image captured by the seller device, if the product indicated by the audio data or video data received from the purchaser device is a tangible product, and
   a screen output from the seller device, if the product indicated by the audio data or video data received from the purchaser device is an intangible product, and
   wherein the un-contact commerce service is configured to share all types of input data obtainable from the purchaser device and the seller device, the shared all types of input data being shared with the purchaser and the seller.

2. The method of claim 1, wherein the interface associated with the product purchase service is further configured to include an interface for product introduction or an interface for product consultation.

3. The method of claim 2, wherein either of the interface for product introduction or the interface for product consultation is provided through the display device and includes the image captured by the seller device or the screen output from the seller device.

4. The method of claim 2, wherein the interface for product introduction includes:
   a chat window between the seller and the purchaser, provided through the display device together with the image captured by the seller device, or
   a chat window between the seller and the purchaser, provided through the display device together with the screen output from the seller device.

5. The method of claim 2, wherein the interface for product introduction includes:
   a one-to-many chat window between the seller and a plurality of purchasers, provided through the display device together with the image captured by the seller device, or
   a one-to-many chat window between the seller and a plurality of purchasers, provided through the display device together with the screen output from the seller device.

6. The method of claim 5, further comprising:
   receiving audio data obtained through a plurality of purchaser devices;
   converting the received audio data into text data through a speech-to-text (STT) algorithm, the text data forming a question about a product; and
   transmitting the text data to the seller device.

7. The method of claim 2, wherein the interface for product consultation includes at least one among an image of a product, basic setting information, price, and option selection information, provided through the display device together with the screen output from the seller device.

8. The method of claim 7, further comprising:
   providing, to the purchaser device, an interface for selecting at least one among a product kind, product basic setting information, and option selection information; and
   transmitting, to a manager device, product information reflecting the selection.

9. The method of claim 1, further comprising after the providing the interface associated with the product purchase service:
   providing, to the purchaser device, a payment interface capable of purchasing a product; and
   receiving, from the purchaser device, payment information including at least one among the purchaser's name, address, unique identification information, payment information, and signature.

10. The method of claim 1, wherein the providing the interface associated with the product purchase service includes:
receiving a remote-control request from the purchaser device; and
providing, to the display device, a pointer capable of selecting an object, along with a screen provided in the display device, according to the remote-control request from the purchaser device,
wherein the pointer provided to the purchaser device is visible within a product image provided by the seller and is controlled by the purchaser, such that the seller and the purchaser can simultaneously verify the product image under pointer control by the purchaser.

11. The method of claim 1, further comprising before the checking:
registering the display device as a display device for the un-contact commerce service according to a request signal of the seller device or the purchaser device.

12. The method of claim 1, further comprising after the providing the access information:
receiving, from the purchaser device, a captured image concerning the access information; and
recognizing the purchaser's voice.

13. The method of claim 12,
wherein the access information includes an access code or an access sentence, the access code composed of at least one of numbers, Korean characters, and English characters, and
wherein the method further includes after the providing the access information:
receiving audio data or video data from the purchaser device accessed through the access code or the access sentence; and
determining whether the purchaser device is able to use an un-contact commerce service through the display device, based on the received audio data or video data.

14. The method of claim 1, wherein the receiving the audio data or video data includes:
receiving text data of the purchaser obtained by the purchaser device.

15. A commerce server for providing an un-contact commerce service, the commerce server comprising:
a communication unit configured to transmit and receive data to and from each of a seller device operated by a seller, a purchaser device operated by a purchaser, and a display device operated by the purchaser;
a storage unit; and
a processor that is operatively connected to the communication unit and the storage unit and is configured to
check, based on an input of the purchaser, whether audio data or video data can be received from the display device, the checking determining whether the display device is equipped with a microphone or camera;
provide, to the display device, access information for obtaining audio data or video data of the purchaser, if the checking determines that the display device is not equipped with a microphone or camera;
receive audio data or video data from the purchaser device through the access information;
determine whether the purchaser device can use the un-contact commerce service through the display device, based on the audio data or video data received from the purchaser device;
transmit, to the seller device, the audio data or video data received from the purchaser device; and
provide an interface associated with a product purchase service to the display device, the product purchase service associated with a product indicated by the audio data or video data received from the purchaser device,
wherein the interface associated with the product purchase service is configured to include:
an image captured by the seller device, if the product indicated by the audio data or video data received from the purchaser device is a tangible product, and
a screen output from the seller device, if the product indicated by the audio data or video data received from the purchaser device is an intangible product, and
wherein the un-contact commerce service is configured to share all types of input data obtainable from the purchaser device and the seller device, the shared all types of input data being shared with the purchaser and the seller.

* * * * *